(12) United States Patent
Guo et al.

(10) Patent No.: US 12,626,478 B2
(45) Date of Patent: May 12, 2026

(54) METHOD FOR OMNIDIRECTIONAL DENSE REGRESSION FOR MACHINE PERCEPTION TASKS VIA DISTORTION-FREE CNN AND SPHERICAL SELF-ATTENTION

(71) Applicant: Robert Bosch GmbH, Stuttgart (DE)

(72) Inventors: Yuliang Guo, Palo Alto, CA (US); Zhixin Yan, Shanghai (CN); Yuyan Li, Columbia, MO (US); Xinyu Huang, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 897 days.

(21) Appl. No.: 17/548,638

(22) Filed: Dec. 13, 2021

(65) Prior Publication Data

US 2023/0186590 A1     Jun. 15, 2023

(51) Int. Cl.
| | |
|---|---|
| *G06V 10/40* | (2022.01) |
| *G06N 3/045* | (2023.01) |
| *G06T 7/10* | (2017.01) |

(52) U.S. Cl.
CPC ............. *G06V 10/40* (2022.01); *G06N 3/045* (2023.01); *G06T 7/10* (2017.01); *G06T 2207/20084* (2013.01)

(58) Field of Classification Search
CPC ........ G06V 10/40; G06V 10/82; G06N 3/045; G06N 3/08; G06T 7/10; G06T 2207/20084; G06T 5/60; G06T 5/80
USPC ......................................................... 382/157
See application file for complete search history.

(56) References Cited

U.S. PATENT DOCUMENTS

| | | | |
|---|---|---|---|
| 2021/0012567 A1* | 1/2021 | Zhang ..................... | G06T 17/20 |
| 2022/0138977 A1* | 5/2022 | Yan .......................... | G06N 3/08 |
| | | | 382/154 |
| 2022/0189151 A1* | 6/2022 | Liu ......................... | G06V 10/82 |
| 2023/0177637 A1* | 6/2023 | Guo ..................... | G06N 3/0455 |
| | | | 345/427 |

OTHER PUBLICATIONS

Yun I, Lee HJ, Rhee CE. Improving 360 Monocular Depth Estimation via Non-local Dense Prediction Transformer and Joint Supervised and Self-supervised Learning. arXiv e-prints. Sep. 2021:arXiv-2109. (Year: 2021).*

(Continued)

*Primary Examiner* — Jennifer Mehmood
*Assistant Examiner* — Heath E. Wells
(74) *Attorney, Agent, or Firm* — Maginot, Moore & Beck LLP

(57) ABSTRACT

A method and device for performing a perception task are disclosed. The method and device incorporate a dense regression model. The dense regression model advantageously incorporates a distortion-free convolution technique that is designed to accommodate and appropriately handle the varying levels of distortion in omnidirectional images across different regions. In addition to distortion-free convolution, the dense regression model further utilizes a transformer that incorporates an spherical self-attention that use distortion-free image embedding to compute an appearance attention and uses spherical distance to compute a positional attention.

20 Claims, 6 Drawing Sheets

400

(56)     References Cited

OTHER PUBLICATIONS

Dosovitskiy, A. et al., "An Image is Worth 16×16 Words: Transformers for Image Recognition at Scale," ICLR Conference Paper, 2021, arXiv:2010.11929v2, https:/arxiv.org/abs/2010.11929 (22 pages).
Wang, F.-E. et al., "BiFuse: Monocular 360° Depth Estimation via Bi-Projection Fusion," CVPR, 2020, IEEE/CVF Conference on Computer Vision and Pattern Recognition (10 pages).
Ranftl, R. et al., "Vision Transformers for Dense Prediction," arXiv:2103.13413v1, 2021, https://arxiv.org/abs/2103.13413 (15 pages).
Yun, I. et al., "Improving 360 Monocular Depth Estimation via Non-local Dense Prediction Transformer and Joint Supervised and Self-supervised Learning," arXiv:2109.10563v2, 2021, https://arxiv.org/abs/2109.10563 (13 pages).

* cited by examiner

200

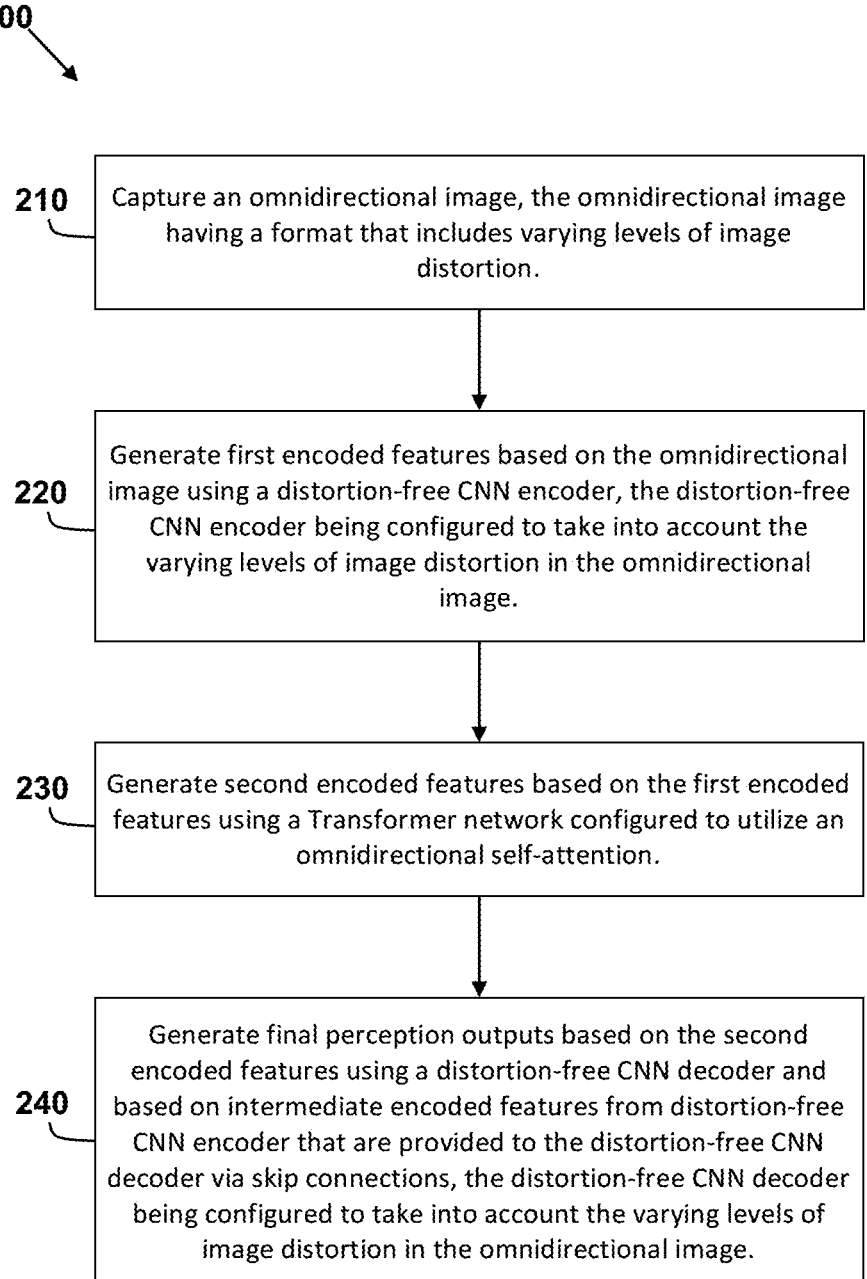

210 Capture an omnidirectional image, the omnidirectional image having a format that includes varying levels of image distortion.

220 Generate first encoded features based on the omnidirectional image using a distortion-free CNN encoder, the distortion-free CNN encoder being configured to take into account the varying levels of image distortion in the omnidirectional image.

230 Generate second encoded features based on the first encoded features using a Transformer network configured to utilize an omnidirectional self-attention.

240 Generate final perception outputs based on the second encoded features using a distortion-free CNN decoder and based on intermediate encoded features from distortion-free CNN encoder that are provided to the distortion-free CNN decoder via skip connections, the distortion-free CNN decoder being configured to take into account the varying levels of image distortion in the omnidirectional image.

FIG. 3

METHOD FOR OMNIDIRECTIONAL DENSE REGRESSION FOR MACHINE PERCEPTION TASKS VIA DISTORTION-FREE CNN AND SPHERICAL SELF-ATTENTION

FIELD

The system and method disclosed in this document relates to machine perception and, more particularly, to omnidirectional dense regression for machine perception tasks via distortion-free CNN and spherical self-attention.

BACKGROUND

Unless otherwise indicated herein, the materials described in this section are not admitted to be the prior art by inclusion in this section.

Omnidirectional images, also called 360 images or panoramic images, are one of the most popular image types for many applications such as virtual reality, autonomous driving, and robotics. Additionally, omnidirectional dense regression problems are critical to the operation of three-dimensional or omnidirectional measurement tools, especially when visual interactions with human beings or the production of interpretable outputs is desired. Typical dense regression problems include depth estimation and semantic segmentation, where both local feature encoding and global feature encoding are required for high levels of performance.

Previous attempts at solving these dense regression problems were based on a deep structure of local encoding layers, such as a Fully Convolutional Network (FCN). However, FCNs have limitations both with respect dense regression problems and with respect to processing omnidirectional images. Firstly, FCNs lack the global context that is critical for determining the physical scale for depth estimation or for inferring an overall layout of the semantically meaningful scene. Secondly, FCNs have huge drawbacks when applied to processing omnidirectional images because omnidirectional images include different levels of image distortion within different regions of the image, but a conventional FCN processes each region of the image equivalently.

Recently, an emerging technique to handle global encoding is the self-attention module, which is integrated as a core part of Transformer architectures. The self-attention module is highly suitable for dense regression problems, such as depth estimation or semantic segmentation, because it explicitly utilizes long-range contextual information from different regions. However, the typical design of the self-attention module is not suitable for omnidirectional images for at least two reasons. Firstly, different regions from an omnidirectional image include different levels of image distortion such that the hidden features of different regions are not directly comparable to each other. Secondly, the position embedding utilized in Transformer architectures is not compatible with omnidirectional space, such that the position embedding is not effective.

Accordingly, what is needed is a technique for processing omnidirectional images for dense regression problems that incorporates both local feature encoding and global feature encoding, and which takes into account the varying levels of distortion present in omnidirectional image formats.

SUMMARY

A method for operating a device to perform a perception task is disclosed. The method comprises receiving, with a processor of the device, an omnidirectional image of an environment. The method further comprises generating, with the processor of the device, first encoded features based on the omnidirectional image using a convolutional neural network encoder. The method further comprises generating, with the processor, second encoded features based on the first encoded features using a transformer neural network. The method further comprises generating, with the processor, final perception outputs based on the second encoded features using a convolutional neural network decoder.

A device for performing a perception task is disclosed. The device comprises a 360-camera sensor configured to capture an omnidirectional image of an environment. The device further comprises a memory configured to store a neural network model including a convolutional neural network encoder, a transformer neural network, and a convolutional neural network decoder. The device further comprises a processor operably connected to the 360-camera sensor and the memory. The processor is configured to generate first encoded features based on the omnidirectional image using the convolutional neural network encoder. The processor is further configured to generate second encoded features based on the first encoded features using the transformer neural network. The processor is further configured to generate final perception outputs based on the second encoded features using the convolutional neural network decoder.

BRIEF DESCRIPTION OF THE DRAWINGS

The foregoing aspects and other features of the method and system are explained in the following description, taken in connection with the accompanying drawings.

FIG. 3 shows a method for performing the machine perception task in the omnidirectional image domain.

DETAILED DESCRIPTION

Figure 1:
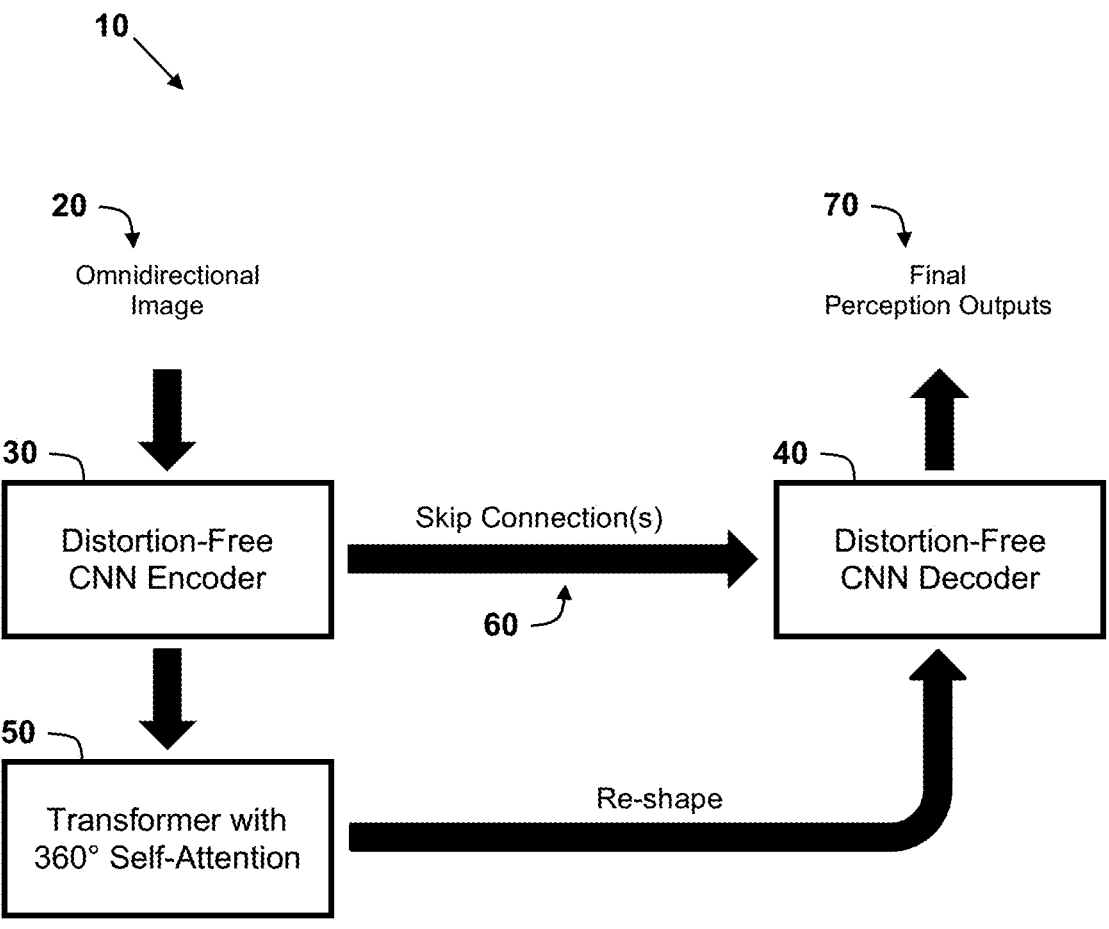
FIG. 1 summarizes a dense regression model for performing a machine perception task in the omnidirectional image domain.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

FIG. 1 summarizes a dense regression model 10 utilized by the system and methods described herein to perform a machine perception task requiring dense regression in the omnidirectional image domain, such as depth estimation or semantic segmentation of an omnidirectional image. The dense regression model 10 advantageously incorporates a distortion-free convolution technique that is designed to accommodate and appropriately handle the varying levels of distortion in omnidirectional images across different regions. In addition to distortion-free convolution, the dense regression model 10 further utilizes a transformer that incorporates an spherical self-attention that use distortion-free image embedding to compute an appearance attention and uses spherical distance to compute a positional attention.

As used herein, the term "omnidirectional image" refers to any image captured with a field of view that covers 360 degrees (i.e., a full circle) in at least one plane and, in some cases, covers an entire sphere. Such omnidirectional images may also be referred to as "360 images" or "panoramic images." It should be appreciated that omnidirectional images may utilize a variety of different image formats, such as the Equirectangular Projection (ERP) image format, the Cubemap Projection (CMP) image format, and the Equiangular Cubemap Projection (EAC) image format.

The dense regression model 10 adopts an encoder-decoder structure for preforming a perception task (e.g., depth estimation or semantic segmentation) with respect to an omnidirectional image 20. Particularly, the dense regression model 10 includes a distortion-free CNN (convolutional neural network) encoder 30 and a distortion-free CNN decoder 40. Additionally, a transformer 50 with omnidirectional) (360° self-attention is incorporated between the encoder 30 and the decoder 40. In at least some embodiments, one or more skip connections 60 are provided between layers of the encoder 30 and the decoder 40, which aid in the recovery of granular and dense final perception outputs 70 (e.g., a depth map or semantic map) by the decoder 40. The final perception outputs 70 are in the omnidirectional image domain and, preferably having a resolution that is the same as or at least approaching that of the original omnidirectional image 20. In other words, the final perception outputs 70 are dense regression outputs for the perception task.

The distortion-free CNN encoder 30 receives the omnidirectional image 20 and generates encoded features of omnidirectional image 20 using one or more distortion-free convolution layers. The distortion-free convolution layers are designed to accommodate and appropriately handle the varying distortion in omnidirectional images across different regions.

The transformer 50 receives the encoded features of omnidirectional image 20 from the distortion-free CNN encoder 30 and generates self-attention features using one or more transformer layers. The transformer layers each incorporate an spherical self-attention that uses distortion-free image embedding to compute an appearance attention and uses spherical distance to compute a positional attention. The self-attention features of the transformer 50 are re-shaped before being provided to the distortion-free CNN decoder 40.

The distortion-free CNN decoder 40 receives re-shaped self-attention features of the transformer 50 and generates the granular and dense final perception outputs 70 (e.g., a depth map or semantic map) using one or more distortion-free convolution (or deconvolution) layers. In at least some embodiments, the distortion-free CNN decoder 40 incorporates one or more intermediate outputs from the distortion-free CNN encoder 30 via the skip connections 50, to aid in the recovery of the final perception outputs 70.

Some exemplary implementations and operations of the dense regression model 10 are discussed in greater detail below with respect to FIGS. 4-6. However, it should be appreciated that the dense regression model 10 might be implemented in a wide variety of manners.

Exemplary End-User Device

Figure 2:
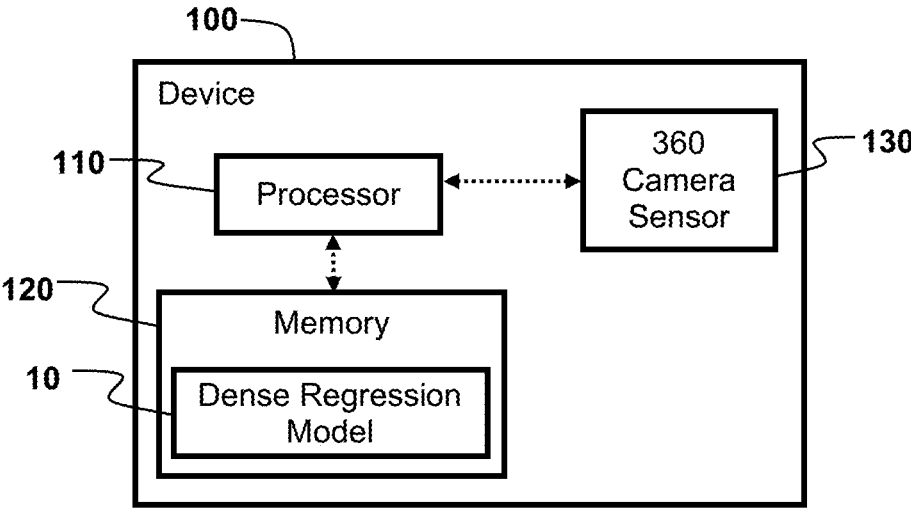
FIG. 2 shows an exemplary end-user device that incorporates the dense regression model of FIG. 1 to perform the machine perception task.

FIG. 2 shows an exemplary end-user device 100 that incorporates the dense regression model 10 to perform a machine perception task. The end-user device 100 comprises a processor 110, a memory 120, and a 360-camera sensor 130. It will be appreciated that the end-user device 100 may comprise a wide variety of devices such as a 3D scanner or a 360-camera, as well as robotic devices incorporating such a 3D scanner or 360-camera, such as an autonomous vehicle, a robot vacuum cleaner, or an autonomous drone. Accordingly, it should be appreciated that the illustrated embodiment of the end-user device 100 is only one exemplary embodiment is merely representative of any of various manners or configurations of end-user devices.

The processor 110 is configured to execute instructions to operate the end-user device 100 to enable the features, functionality, characteristics and/or the like as described herein. To this end, the processor 110 is operably connected to the memory 120 and the 360-camera sensor 130. The processor 110 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the end-user device 100 to perform various operations described herein. The memory 120 may be of any type of device capable of storing information accessible by the processor 110, such as a memory card, ROM, RAM, hard drives, discs, flash memory, or any of various other computer-readable medium serving as data storage devices, as will be recognized by those of ordinary skill in the art. In at least one embodiment, the memory 120 stores the trained dense regression model 10.

The 360-camera sensor 130 is configured to capture an omnidirectional image of an environment. The 360-camera sensor 130 may capture the omnidirectional image in any suitable format, such as the Equirectangular Projection (ERP) image format, the Cubemap Projection (CMP) image format, and the Equiangular Cubemap Projection (EAC) image format. The processor 110 is configured to operate the 360-camera sensor 130 to capture an omnidirectional image and execute program instructions of the trained dense regression model 10 to generate final perception outputs (e.g., depth estimations, semantic segmentation labels, etc.) based on an omnidirectional image captured using the 360-camera sensor 130. In some embodiments, the process 110 operates one or more actuators (not shown) based on the generated final perception outputs, such as in the case that the end-user device 100 is or is incorporated into an autonomous vehicle, a robot vacuum cleaner, an autonomous drone, or similar system.

Method for Performing a Perception Task in the Omnidirectional Image Domain

A variety of methods and processes are described below for operating the end-user device 100 to perform a machine perception task in the omnidirectional image domain. In these descriptions, statements that a method, processor, and/or system is performing some task or function refers to a controller or processor (e.g., the processor 110 of the end-user device 100) executing programmed instructions stored in non-transitory computer readable storage media (e.g., the memory 120 of the end-user device 100) operatively connected to the controller or processor to manipulate data or to operate one or more components in the end-user device 100 to perform the task or function. Additionally, the steps of the methods may be performed in any feasible chronological order, regardless of the order shown in the figures or the order in which the steps are described.

FIG. 3 shows a method 200 for performing a machine perception task in the omnidirectional image domain. The method 200 advantageously applies distortion-free convolution layers to make the convolution compatible with omnidirectional image space and to take into account the varying levels of distortion in omnidirectional images. Consequently, the encoder of the dense regression model utilized by the method 200 generates more detailed and structured information, thus improving the detail recovery for the final dense regression. Additionally, the method 200 advantageously utilizes a self-attention model tailored to the omnidirectional image space, such that the appearance attention can benefit from the distortion-free encoding and the positional attention is better represented using spherical distances. As a result, the dense regression model utilized by the method 200 has much smaller learnable parameter space or fine-tunable space and can largely benefit from the pre-trained models from the perspective image domain.

The method 200 begins with capturing an omnidirectional image, the omnidirectional image having a format that includes varying levels of image distortion (block 210). Particularly, the processor 110 operates the 360-camera sensor 130 to capture at least one omnidirectional image, and stores the at least one omnidirectional image in the memory 120. Alternatively, the processor 110 may simply receive the at least one omnidirectional image from some data source.

As noted before, omnidirectional images may utilize a variety of different image formats, such as the Equirectangular Projection (ERP) image format, the Cubemap Projection (CMP) image format, and the Equiangular Cubemap Projection (EAC) image format. In any of these formats, the omnidirectional image includes image distortion. This image distortion is, of course, a result from mapping the spherical field of view of the 360-camera sensor 130 onto a single flat image, in the case of the ERP image format, or onto six different flat images, in the case of the CMP and EAC image formats.

The extent of the image distortion in the omnidirectional images is variable between different regions of the omnidirectional image. For example, ERP images include minimal image distortion in regions that are near the midpoint along the height of the image, but significant distortion along the top of the image and along the bottom of the image. As another example, CMP images have minimal distortion near the middle of each cube face, but significant distortion nearer to the edges, and particularly the corners, of each cube face.

The method 200 continues with generating first encoded features based on the omnidirectional image using a distortion-free CNN encoder, the distortion-free CNN encoder being configured to take into account the varying levels of image distortion in the omnidirectional image (block 220). Particularly, the processor 110 executes program instructions of the distortion-free CNN encoder 30 of the dense regression model 10 to generate a plurality of encoded features. The encoded features include final encoded features output by a final convolution layer of the distortion-free CNN encoder 30, as well as various intermediate encoded features output by various intermediate convolution layers of the distortion-free CNN encoder 30.

In at least one embodiment, the processor 110 generates the plurality of encoded features by performing a sequence of distortion-free convolution operations on the omnidirectional image using the distortion-free CNN encoder 30. In each case, distortion-free convolution operations take into account the varying levels of image distortion across the different regions of the omnidirectional image. In at least one embodiment, the processor 110 generates the plurality of encoded features by performing a pooling operations using the distortion-free CNN encoder 30 after each distortion-free convolution operation in the sequence of distortion-free convolution operations.

Figure 4:
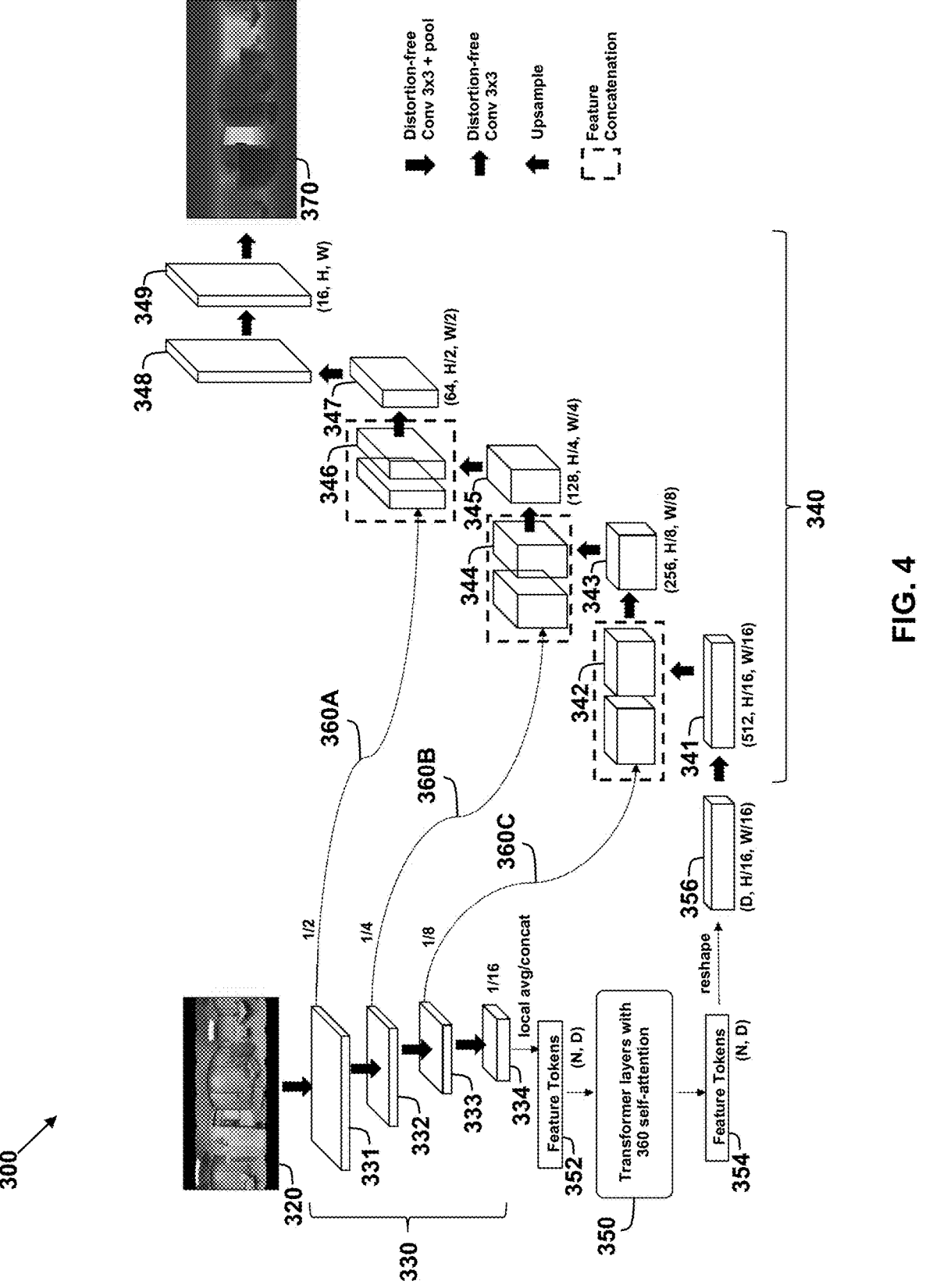
FIG. 4 shows an exemplary neural network for performing the machine perception task in the omnidirectional image domain.

FIG. 4 shows an exemplary neural network 300 for performing the machine perception task in the omnidirectional image domain. It should be appreciated that the neural network 300 is one exemplary implementation of the dense regression model 10. Accordingly, the neural network 300 likewise adopts an encoder-decoder structure including a distortion-free CNN encoder 330 and a distortion-free CNN decoder 340. Additionally, a transformer 350 with omnidirectional (360°) self-attention is incorporated between the encoder 330 and the decoder 340. Finally, skip connections 360A-C are provided between layers of the encoder 330 and the decoder 340.

The distortion-free CNN encoder 330 is one exemplary implementation of the distortion-free CNN encoder 30 of the dense regression model 10. The distortion-free CNN encoder 330 receives an omnidirectional image 320 and generates encoded features from the omnidirectional image 320 using one or more distortion-free convolution layers. The distortion-free convolution layers are designed to accommodate and appropriately handle the varying levels of distortion in the omnidirectional image 320 across different regions. Each respective distortion-free convolution layer of the distortion-free CNN encoder 330 is followed by a respective pooling layer that reduces the dimensionality of the encoded features (e.g., by half). Each distortion-free convolution layer, with pooling layer is indicated by a downward pointing block arrow in FIG. 4.

More particularly, in the illustrated embodiment, the processor 110 performs a first distortion-free convolution operation (e.g., 3×3) on the omnidirectional image 320, followed by a first pooling operation to reduce the dimensionality of the encoded features by half, resulting in first encoded features 331 having dimensions $(D_1, H/2, W/2)$, where H is the height of the omnidirectional image 320, W is the width of the omnidirectional image 320, and $D_1$ is the depth (e.g., 32). Next, the processor 110 performs a second distortion-free convolution operation (e.g., 3×3) on the first encoded features 331, followed by a second pooling operation that reduces the dimensionality of the encoded features by half, resulting in second encoded features 332 having dimensions $(D_2, H/4, W/4)$, where $D_2$ is the depth (e.g., 64). Next, the processor 110 performs a third distortion-free convolution operation (e.g., 3×3) on the second encoded features 332, followed by a third pooling operation that reduces the dimensionality of the encoded features by half, resulting in third encoded features 333 having dimensions $(D_3, H/8, W/8)$, where $D_3$ is the depth (e.g., 128). Finally, the processor 110 performs fourth distortion-free convolution operation (e.g., 3×3) on the third encoded features 333, followed by a fourth pooling operation that reduces the dimensionality of the encoded features by half, resulting in fourth encoded features 334 having dimensions ($D_4$, H/16, W/16), where $D_4$ is the depth (e.g., 256).

Figure 5:
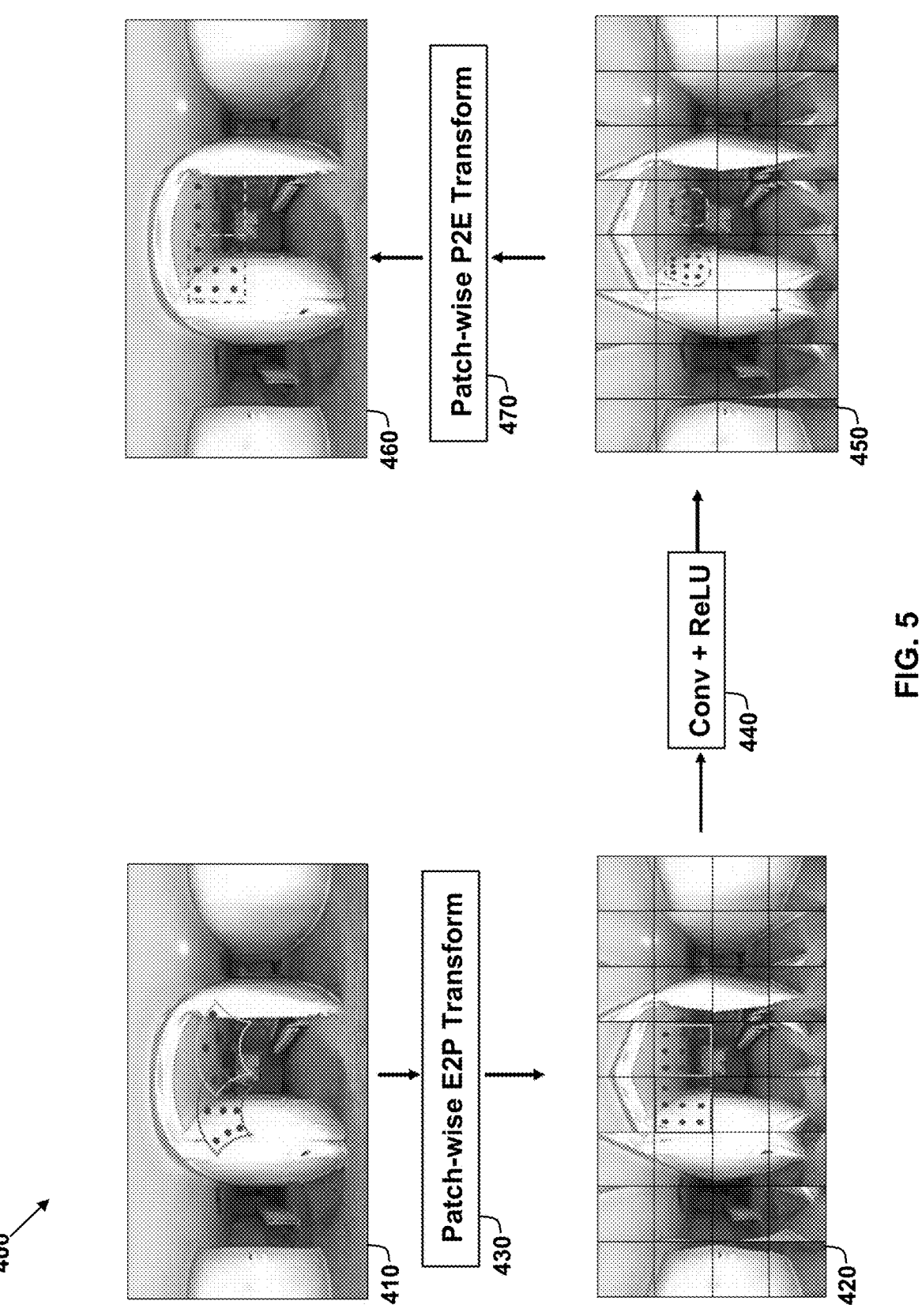
FIG. 5 shows a process for performing distortion-free convolution operation.

FIG. 5 shows a process 400 for performing distortion-free convolution operation. Particularly, as noted above, the convolution layers of the distortion-free CNN encoder 330 each perform a distortion-free convolution operation. The process 400 is one exemplary implementation of a distortion-free convolution operation. In summary, the respective convolution layer receives omnidirectional input feature data 410 (e.g., the original omnidirectional image or features from a previous layer) which are in the omnidirectional image domain. The processor 110 transforms the omnidirectional input feature data 410 a plurality of input perspective feature patches 420 (e.g., squares), which are in the perspective projection image domain, using a patch-wise Equirectangular to Perspective (E2P) transform 430. Next, the processor 110 performs a regular convolution operation 440 on the plurality of input perspective feature patches 420 with rectified linear unit (ReLU) activation to generate a plurality of output perspective feature patches 450, which are also in the perspective projection image domain. Finally, the processor 110 transforms the plurality of output perspective feature patches 450 into omnidirectional output feature data 460, which are in the omnidirectional image domain, using a patch-wise Perspective to Equirectangular (P2E) transform 470.

The patch-wise E2P transform 430 is configured to transform the feature data in the omnidirectional image domain into feature data in the perspective projection image domain, such that traditional convolution can be applied in a distortion-free manner. To this end, the processor 110 converts pixels/features of the omnidirectional input feature data 410 into a plurality of three-dimensional (3D) points. For example, given omnidirectional input feature data 410 having a plurality of pixels/features $(u, v)^{omni}$, the processor 110 converts each respective pixel/feature coordinate $(u, v)^{omni}$ into respective polar coordinates $(\phi, \theta)^{world}$ in the world space. In one embodiment, the processor 110 converts pixels/features $(u, v)^{omni}$ into polar coordinates $(\phi, \theta)^{world}$ according to the equations $\phi = u/\text{width}*\pi$ and $\theta = v/\text{height}*\pi$, where width is the width of the omnidirectional data 410 and height is the height of the omnidirectional input feature data 410. Given the polar coordinates $(\phi, \theta)^{world}$ and presuming an arbitrarily defined radius (e.g., a radius equal to 1), the processor 110 determines a respective Cartesian coordinate 3D point $(x, y, z)^{world}$ in the world space from each respective polar coordinate $(\phi, \theta)^{world}$ It should be appreciated, however, that the particular method for converting pixels of an omnidirectional image into three-dimensional points depends on the particular image format of the omnidirectional input feature data 410. Accordingly, different but analogous processes would be utilized for omnidirectional input feature data 410 utilizing the CMP image format or the EAC image format.

Next, the processor 110 defines a plurality of virtual cameras each having a defined field of view and a defined camera pose. Each virtual camera is defined in the same coordinate space as the plurality of 3D points (e.g., in the Cartesian coordinate world space). In at least some embodiments, the position (i.e., the camera origin point) of each virtual camera is located at a common center point corresponding to the position from which the original omnidirectional image was captured (e.g., (0,0,0) in the Cartesian coordinate world space). Thus, the respective camera poses of the plurality of virtual cameras only differ in their camera orientation (i.e., viewing angle from that common center point).

In at least some embodiments, the processor 110 defines the camera poses of the plurality of virtual camera by defining a plurality of viewing angles. In one embodiment, the defined viewing angles are distributed in a uniform manner through the available angle space (e.g., across two degrees of freedom, horizontal and vertical). Next, the processor 110 defines a field of view for each of the plurality of virtual cameras. In some embodiments, the processor 110 defines all of the plurality of virtual cameras to have the same field of view. In at least one embodiment, the processor 110 selects the fields of view such that the viewing frustums of the plurality of virtual cameras overlap with one another. This results in a padding (e.g., padding size=(kernel size−1)/2)) in each of the plurality of input perspective feature patches 420, which helps to avoid back-projecting conflicting features later.

Finally, the processor 110 generates the plurality of input perspective feature patches 420 using the plurality of virtual cameras and based on the omnidirectional input feature data 410. More particularly, to generate each respective input perspective patch 420, the processor 110 projects the 3D points $(x, y, z)^{world}$ corresponding to the pixels/features $(u, v)^{omni}$ of the omnidirectional input feature data 410 onto an image plane using a respective virtual camera. To generate a respective input perspective patch 420 using a respective virtual camera, the processor 110 first selects a focal length f and defines an image plane that is positioned at the focal length f from the camera origin of respective virtual camera and which is perpendicular to the viewing angle of the respective virtual camera. In at least some embodiments, the processor 110 selects the same focal length f for all of the plurality of input perspective feature patches 420. Next, the processor 110 projects the 3D points $(x, y, z)^{world}$ corresponding to the pixels/features $(u, V)^{omni}$ of the omnidirectional input feature data 410 onto the defined image plane, to recover a plurality of 2D feature points $(X, Y)^{pers}$ corresponding to each of the 3D points $(x, y, z)^{world}$ captured in the viewing frustum of the respective virtual camera. Finally, the processor 110 generates the respective input perspective patch 420 based on plurality of 2D feature points $(X, Y)^{pers}$. In particular, the processor 110 determines feature values for each pixel in the respective perspective projection based on the plurality of 2D feature points $(X, Y)^{pers}$ and the feature values of the corresponding pixels/features $(u, V)^{omni}$ from the omnidirectional input feature data 410, for example using various rasterization or interpolation techniques (e.g. linear, bi-linear, cubic interpolation). The processor 110 repeats this process for each of the plurality of virtual cameras to generate the plurality of input perspective feature patches 420.

After generating the plurality of input perspective feature patches 420, the processor 110 performs a regular convolution operation (e.g., 3×3) with ReLU activation on the plurality of input perspective feature patches 420 to generate the plurality of output perspective feature patches 450. Next, the patch-wise P2E transform 470 is configured to transform the plurality of output perspective feature patches 450 into the omnidirectional output feature data 460, while discarding the features affected from overlapping regions with conflict. Particularly, the processor 110 projects the plurality of output perspective feature patches 450 back into the omnidirectional image domain, using the same plurality of virtual cameras used by the patch-wise E2P transform 430 before. To remove the effect of conflict between neighboring patches, the processor 110 performs the projection such that the features in the omnidirectional output feature data 460 corresponds to floating position in a small area in the patch-wise perspective domain. Based on the omnidirectional (e.g., equirectangular) geometry, each square region in the omnidirectional output feature data 460 has a smaller corresponding area in plurality of output perspective feature patches 450. Combined with the overlapping view frustums and/or the padding in the plurality of input perspective feature patches 420, the patch-wise P2E transform 470 ensures the features back-projected to the omnidirectional image domain are not affected by the features crossing the border of neighboring patches 450.

Returning to FIG. 3, the method 200 continues with generating second encoded features based on the first encoded features using a Transformer network configured to utilize an spherical self-attention (block 230). Particularly, the processor 110 executes program instructions of the transformer 50 of the dense regression model 10 to generate further encoded features that incorporate an omnidirectional (360°) self-attention, based on the final encoded features of the distortion-free CNN encoder 30 of the dense regression model 10.

In at least one embodiment, the processor 110 generates a plurality of feature vectors/tokens, each having a predetermined length, based on the final encoded features of the distortion-free CNN encoder 30. The processor 110 generates the further encoded features that incorporate an omnidirectional (360°) self-attention based on the plurality of feature vectors/tokens. The plurality of feature vectors/tokens are formed into an input feature matrix/map for the transformer 50.

In at least one embodiment, the processor 110 generates the further encoded features that incorporate an omnidirectional (360°) self-attention by applying a sequence of transformer layers to the input feature matrix/map. In each transformer layer, the processor 110 determines an output feature matrix/map based on the input feature matrix/map using at least one self-attention matrix. In one embodiment, the processor 110 generates an appearance self-attention matrix based on a comparison of each feature vector/token in the plurality of feature vectors/tokens with each other feature vector/token in the plurality of feature vectors/tokens. In one embodiment, the processor 110 generates a positional self-attention matrix based on a spherical distance between each feature vector/token in the plurality of feature vectors/tokens and each other feature vector/token in the plurality of feature vectors/tokens.

Returning to the detailed example of FIG. 4, the distortion-free CNN encoder 330 generates the fourth encoded features 334 as its final output. The processor 110 divides the fourth encoded features 334 into a plurality of N feature patches having dimensions ($N_1$, $N_2$). As used herein a "patch" refers to a subset or segment of a larger quantity of data (e.g., image data or feature data). Next, the processor 110 encodes each feature patch into a feature vector having a length D using local averaging and/or concatenation, resulting in N feature vectors. These N feature vectors having length D are referred to as input feature tokens 352. The input feature tokens 352 are fed into a transformer 350 to generate output feature tokens 354.

The transformer 350 is one exemplary implementation of the transformer 50 of the dense regression model 10. The transformer 350 receives the input feature tokens 352 and generates the output feature tokens 354 using one or more sequentially arranged transformer layers. The transformer layers each utilize an omnidirectional (360°) self-attention that uses distortion-free feature embedding to compute an appearance attention matrix and uses spherical distance to compute a positional attention matrix. The computed appearance attention and positional attention matrices are incorporated into the output feature tokens 354. The output features of the transformer 350 are reshaped before being provided to the distortion-free CNN decoder 340.

Figure 6:
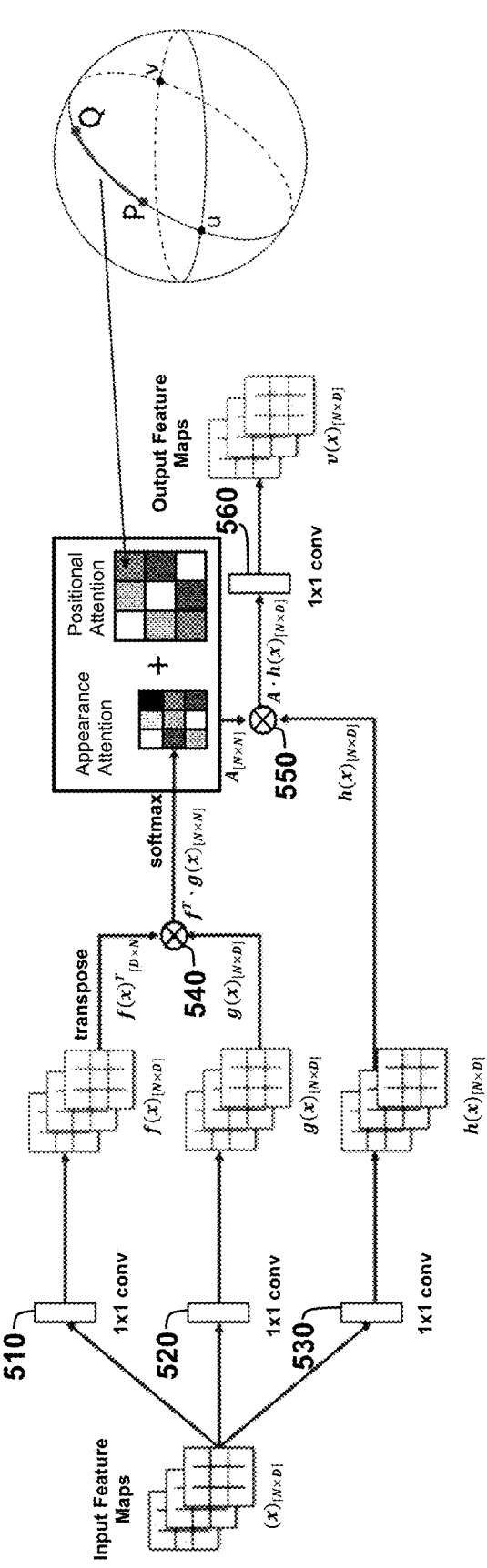
FIG. 6 shows an exemplary transformer layer having omnidirectional (360°) self-attention.

FIG. 6 shows an exemplary transformer layer 500 having omnidirectional) (360° self-attention. In summary, the N input feature tokens 352, each having a length D, are combined into an input feature map (also referred to herein feature matrix) having dimensions N×D, denoted (x). The processor 110 performs three different convolution operations 510, 520, and 530 (e.g., 1×1) on the input feature map (x) to generate three intermediate feature maps, denoted f(x), g(x), and h(x), each having dimensions N×D. The processor 110 transposes the intermediate feature map f(x) to arrive at a transposed intermediate feature map $f^T(x)$ having dimensions D×N. The processor 110 determines a product 540 of the transposed intermediate feature map $f^T(x)$ with the intermediate feature map g(x), to arrive at a further intermediate feature map $f^T \cdot g(x)$ having dimensions N×N.

The processor 110 applies softmax function to intermediate feature map $f^T \cdot g(x)$ to arrive at an appearance attention matrix having dimensions N×N. Each value of the appearance attention matrix represents a similarity or comparison between a pair of the N input feature tokens 352. Next, the processor 110 calculates a positional attention matrix in which each value is a spherical distance or great-circle distance between a pair of the N input feature tokens 352 in the omnidirectional image domain. In particular, these spherical distances are determined based on the center positions of the patch of encoded features corresponding to each respective input feature token 352, and thus provide positional encoding for the feature tokens 352. The processor 110 determines a self-attention matrix, denoted A, as a sum of the appearance attention matrix and the positional attention matrix.

The processor 110 determines a product 550 of the self-attention matrix A with the intermediate feature map h(x), to arrive at a further intermediate feature map A·h(x) having dimensions N×D. Finally, the processor 110 performs a final convolution operation 560 (e.g., 1×1) on the intermediate feature map A·h(x) to arrive output feature map, denoted v(x), each having dimensions N×D.

Returning to FIG. 4, in some embodiments, the transformer 350 may comprise multiple the transformer layers 500 applied in sequence. In each case, the processor 110 provides the output feature map v(x) as input to the next transformer layer of the 350. After the final transformer layer 500, the output feature map v(x) can be split into the N output feature tokens 354 having lengths D. The processor 110 reshapes these output feature tokens 354 before providing them to the distortion-free CNN decoder 340 as reshaped output features 356.

The transformer 350 has several advantages over a typical transformer architecture when applied to omnidirectional image features. First, different regions from an omnidirectional image include different levels of image distortion such that the direct hidden features are not comparable to each other to compute the appearance attention matrix, as in a typical transformer architecture. This issue is resolved by the architecture of the transformer layer 500. Second, the position embedding of a typical transformer architecture is not compatible with omnidirectional image space, such that typical positional embedding is not effective. In the transformer 350, positional embedding is instead achieved via the spherical distance based positional self-attention matrix of the transformer layer 500.

Returning to FIG. 3, the method 200 continues with generating final perception outputs based on the second encoded features using a distortion-free CNN decoder and based on intermediate encoded features from distortion-free CNN encoder that are provided to the distortion-free CNN decoder via skip connections, the distortion-free CNN decoder being configured to take into account the varying levels of image distortion in the omnidirectional image (block 240). Particularly, the processor 110 executes program instructions of the distortion-free CNN decoder 40 of the dense regression model 10 to generate the final perception outputs 70 (e.g., a depth map or semantic map) based on the reshaped output features of the transformer 50. The final perception outputs 70 are the omnidirectional image domain and, preferably, have a resolution that is the same as or at least approaching that of the original omnidirectional image 20.

In at least one embodiment, the processor 110 generates the final perception outputs 70 by performing a sequence of convolution operations on the reshaped output features of the transformer 50 using the distortion-free CNN decoder 40. In at least one embodiment, the processor 110 performs an upsampling and/or unpooling operation using the distortion-free CNN decoder 40 after performing each convolution operation in the sequence of convolution operations. In at least one embodiment, the distortion-free CNN decoder 40 receives intermediate encoded features from the distortion-free CNN encoder 30 via skip connections 50. In one embodiment, the processor 110 concatenates the intermediate encoded features with intermediate decoded features of the distortion-free CNN decoder 40.

Returning to detailed example of FIG. 4, the processor 110 reshapes the output feature tokens 354 into re-shaped output features 356 having dimensions (D, H/16, W/16), where D is the length of the feature tokens 352, 354. The re-shaped output features 356 are provided as inputs to the distortion-free CNN decoder 340.

The distortion-free CNN decoder 340 is one exemplary implementation of the distortion-free CNN decoder 40 of the dense regression model 10. The distortion-free CNN decoder 340 receives re-shaped output features 356 of the transformer 350 and generates the granular and dense final perception outputs 370 (e.g., a depth map or semantic map) using one or more distortion-free convolution (or deconvolution) layers. Each distortion-free convolution layer is indicated by a rightward pointing block arrow in FIG. 4. After each distortion-free convolution layer, the distortion-free CNN decoder 340 includes a respective upsampling and/or unpooling layer that increases the dimensionality of the decoded features (e.g., by twice). Each upsampling and/or unpooling layer is indicated by an upward pointing block arrow in FIG. 4. Finally, in at least some embodiments, the distortion-free CNN decoder 340 incorporates one or more intermediate outputs from the distortion-free CNN encoder 330 via the skip connections 360A-C, to aid in the recovery of the final perception outputs 370. After at least some of the upsampling and/or unpooling layer, the upsampled features are concatenated with correspondingly dimensioned intermediate outputs from the distortion-free CNN encoder 330 via the skip connections 360A-C.

More particularly, in the illustrated embodiment, the processor 110 performs a fifth distortion-free convolution operation (e.g., 3×3) on the re-shaped output features 356 from the transformer 350, resulting in first decoded features

341 having dimensions (D$_5$, H/16, W/16), where D$_5$ is the depth (e.g., 512). Next, the processor 110 performs an upsampling and/or unpooling operation on the first decoded features 341 to arrive at first upsampled features 342 having twice the dimensionality of the first decoded features 341. The processor 110 then concatenates the first upsampled features 342 with the third encoded features 333 received via the skip connection 360C from the distortion-free CNN encoder 330, and performs a sixth distortion-free convolution operation (e.g., 3×3) on the concatenated result to arrive at second decoded features 343 having dimensions (D$_6$, H/8, W/8), where D$_6$ is the depth (e.g., 256).

Next, the processor 110 performs an upsampling and/or unpooling operation on the second decoded features 343 to arrive at second upsampled features 344 having twice the dimensionality of the second decoded features 343. The processor 110 then concatenates the second upsampled features 344 with the second encoded features 332 received via the skip connection 360B from the distortion-free CNN encoder 330, and performs a seventh distortion-free convolution operation (e.g., 3×3) on the concatenated result to arrive at third decoded features 345 having dimensions (D$_7$, H/4, W/4), where D$_7$ is the depth (e.g., 128).

Next, the processor 110 performs an upsampling and/or unpooling operation on the third decoded features 345 to arrive at third upsampled features 346 having twice the dimensionality of the third decoded features 345. The processor 110 then concatenates the third upsampled features 346 with the first encoded features 331 received via the skip connection 360A from the distortion-free CNN encoder 330, and performs an eighth distortion-free convolution operation (e.g., 3×3) on the concatenated result to arrive at fourth decoded features 347 having dimensions (D$_8$, H/2, W/2), where D$_8$ is the depth (e.g., 64).

Next, the processor 110 performs an upsampling and/or unpooling operation on the fourth decoded features 347 to arrive at fourth upsampled features 348 having twice the dimensionality of the fourth decoded features 347. The processor 110 then performs a ninth distortion-free convolution operation (e.g., 3×3) on the fourth upsampled features 348 to arrive at fifth decoded features 349 having dimensions (D$_9$, H, W), where D$_9$ is the depth (e.g., 16). Finally, the processor 110 performs a final inference (e.g., using a softmax function) to determine the final perception outputs 370 from the fifth decoded features 349. The final perception outputs 370 are the omnidirectional image domain and, preferably, have a resolution that is the same as or at least approaching that of the original omnidirectional image 320.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for operating a device to perform a perception task, the method comprising:

receiving, with a processor of the device, an omnidirectional image of an environment;

generating, with the processor of the device, first encoded features based on the omnidirectional image using a convolutional neural network encoder;

generating, with the processor, second encoded features based on the first encoded features using a transformer neural network; and generating, with the processor, final perception outputs based on the second encoded features using a convolutional neural network decoder.

2. The method of claim 1, wherein (i) the omnidirectional image has a format that includes varying levels of image distortion across different regions of the omnidirectional image and (ii) both the convolutional neural network encoder and the convolutional neural network decoder each perform convolution operations that take into account the varying levels of image distortion across the different regions of the omnidirectional image.

3. The method of claim 1, wherein the transformer neural network incorporates a self-attention matrix that combines (i) a feature similarity based self-attention and (ii) a spherical distance based self-attention.

4. The method of claim 1, the generating the final perception outputs further comprising:

generating the final perception outputs based on the second encoded features and based on intermediate encoded features from the convolutional neural network encoder that are provided to the convolutional neural network decoder via skip connections.

5. The method of claim 1, wherein:

the generating the first encoded features includes performing a first sequence of convolution operations on the omnidirectional image using the convolutional neural network encoder; and the generating the final perception outputs includes performing a second sequence of convolution operations on the second encoded features using the convolutional neural network decoder.

6. The method of claim 5, wherein the performing of at least one respective convolution operation in at least one of the first sequence of convolution operations and the second sequence of convolution operations comprises:

generating a plurality of perspective projection input feature patches based on omnidirectional input features provided as input to the at least one respective convolution operation;

generating a plurality of perspective projection output feature patches by performing a convolution operation on the plurality of perspective projection input feature patches; and generating omnidirectional output features as an output of the at least one respective convolution operation based on the plurality of perspective projection output feature patches.

7. The method of claim 6, the generating the plurality of perspective projection input feature patches further comprising:

defining a plurality of virtual cameras each having a defined field of view and a defined camera pose; and generating each respective perspective projection input feature patch in the plurality of perspective projection input feature patches by projecting features of the omnidirectional input features onto a respective image plane depending on a respective virtual camera of the plurality of virtual cameras.

8. The method of claim 7, wherein viewing frustums of the plurality of virtual cameras are overlapping such that the plurality of perspective projection input feature patches each have a padding.

9. The method of claim 7, the generating the omnidirectional output features further comprising:

projecting each respective perspective projection output feature patch of the plurality of perspective projection output feature patches into an omnidirectional image domain using the respective virtual camera of the plurality of virtual cameras.

10. The method of claim 5, the generating the first encoded features further comprising:

performing a respective pooling operation using the convolutional neural network encoder after performing at least one respective convolution operation in the first sequence of convolution operations.

11. The method of claim 5, the generating the final perception outputs further comprising:

performing a respective upsampling operation using the convolutional neural network decoder after performing at least one respective convolution operation in the second sequence of convolution operations.

12. The method of claim 5, the generating the final perception outputs further comprising:

receiving, at the convolutional neural network decoder, intermediate encoded features from the convolutional neural network via a skip connection; and concatenating the intermediate encoded features with intermediate decoded features of the convolutional neural network decoder.

13. The method of claim 5, the generating the final perception outputs further comprising:

reshaping the second encoded features before performing the second sequence of convolution operations on the second encoded features.

14. The method according to claim 1, the generating the second encoded features further comprising:

generating a plurality of feature vectors each having a predetermined length based on the first encoded features; and generating, using the transformer neural network, the second encoded features based on the plurality of feature vectors.

15. The method of claim 14, the generating the second encoded features further comprising:

generating, using the transformer neural network, a first self-attention matrix based on a comparison of each feature vector in the plurality of feature vectors with each other feature vector in the plurality of feature vectors;

generating, using the transformer neural network, a second self-attention matrix based on a spherical distance between each feature vector in the plurality of feature vectors and each other feature vector in the plurality of feature vectors; and generating, using the transformer neural network, the second encoded features based on the first self-attention matrix and the second self-attention matrix.

16. The method of claim 15, the generating the first self-attention matrix further comprising:

forming an input feature matrix with the plurality of feature vectors;

generating a first intermediate feature matrix by performing a first convolution operation on the input feature matrix;

transposing the first intermediate feature matrix;

generating a second intermediate feature matrix by performing a second convolution operation on the input feature matrix; and generating the first self-attention matrix based on a product of the transposed first intermediate feature matrix and the second intermediate feature matrix.

17. The method of claim 16, the generating the second encoded features further comprising:

generating a third intermediate feature matrix by performing a third convolution operation on the input feature matrix;

generating a third self-attention matrix by summing the first self-attention matrix and the second self-attention matrix;

determining a fourth intermediate feature matrix by determining a product of the third self-attention matrix and the third intermediate feature matrix; and determining an output feature matrix by performing a fourth convolution operation on the fourth intermediate feature matrix, the second encoded features being determined based on the output feature matrix.

18. The method of claim 1, wherein the perception task includes at least one of depth estimation and semantic segmentation and the final perception outputs for the omnidirectional image include at least one of depth estimations and semantic segmentation labels for the omnidirectional image.

19. The method of claim 1 further comprising:

capturing, with a 360-camera sensor of the device, the omnidirectional image of the environment.

20. A device for performing a perception task, the device comprising:

a 360-camera sensor configured to capture an omnidirectional image of an environment;

a memory configured to store a neural network model including a convolutional neural network encoder, a transformer neural network, and a convolutional neural network decoder; and a processor operably connected to the 360-camera sensor and the memory, the processor being configured to:

generate first encoded features based on the omnidirectional image using the convolutional neural network encoder;

generate second encoded features based on the first encoded features using the transformer neural network; and generate final perception outputs based on the second encoded features using the convolutional neural network decoder.

* * * * *